G. W. SODERSTRAND.
POCKET KNIFE.
APPLICATION FILED APR. 13, 1908.
912,197.
Patented Feb. 9, 1909.
2 SHEETS—SHEET 1.
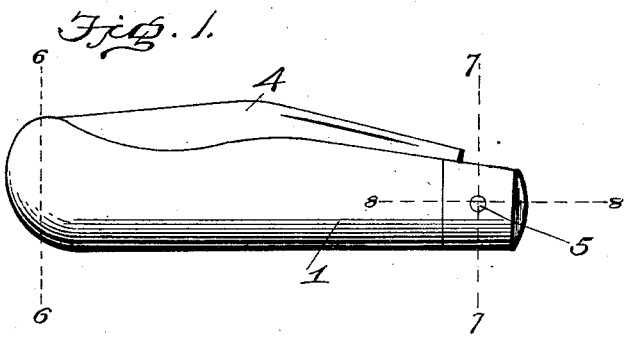
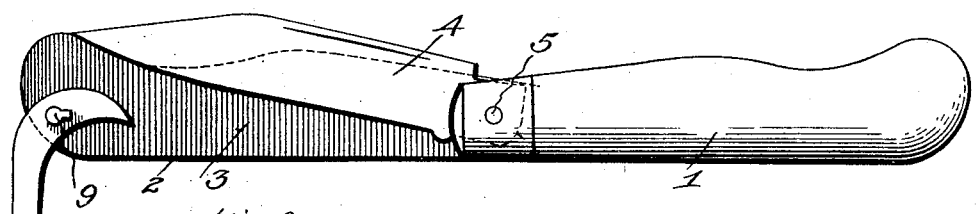
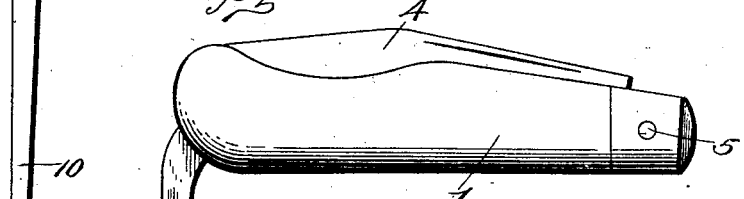
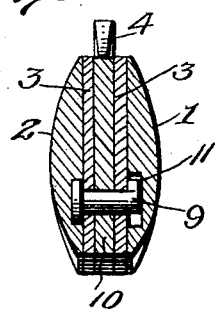
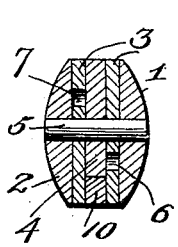
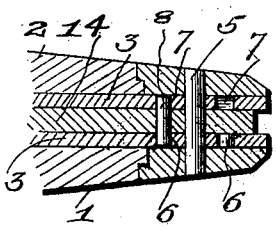
Witnesses
C. E. Hunt.
C. H. Griesbauer.
Inventor
G. W. Soderstrand
By H. B. Willson & Co.
Attorneys
THE NORRIS PETERS CO., WASHINGTON, D. C.

G. W. SODERSTRAND.
POCKET KNIFE.
APPLICATION FILED APR. 13, 1908.
912,197.
Patented Feb. 9, 1909.
2 SHEETS—SHEET 2.
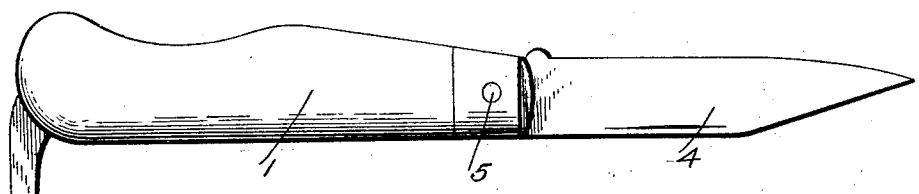
Fig. 4.
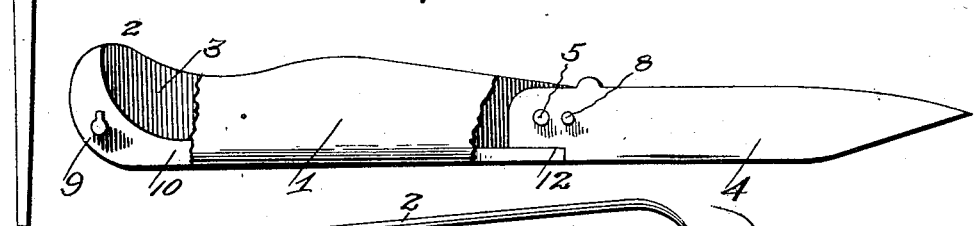
Fig. 5.
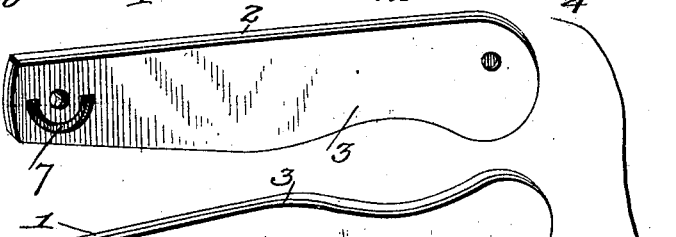
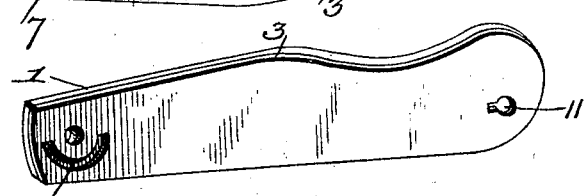
Fig. 9.
Witnesses
C. E. Hunt.
C. H. Griesbauer.
Inventor
G. W. Soderstrand
By H. B. Willson & Co.
Attorneys
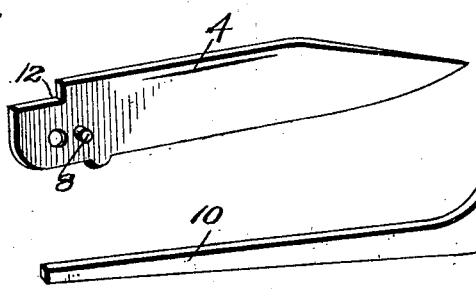

UNITED STATES PATENT OFFICE.

GEORGE W. SODERSTRAND, OF BERTHOUD, COLORADO.

POCKET-KNIFE.

No. 912,197.  Specification of Letters Patent.  Patented Feb. 9, 1909.

Application filed April 13, 1908. Serial No. 426,805.

*To all whom it may concern:*

Be it known that I, GEORGE W. SODERSTRAND, a citizen of the United States, residing at Berthoud, in the county of Larimer and State of Colorado, have invented certain new and useful Improvements in Pocket-Knives; and I do declare the following to be a full, clear, and exact description of the invention, such as will enable others skilled in the art to which it appertains to make and use the same.

My invention relates to knives, and particularly to pocket knives.

The object of the invention is to provide a device of this character which cannot be opened unless the operation is perfectly understood, and which when opened completely is locked in such position so that it cannot be closed unless the operation is known to the person.

A further object of the invention is to provide a knife of this character which will resemble the ordinary knife, and which will be free from springs to hold the blade in open or closed position, and which will be especially adapted for hunters and trappers, although useful for ordinary purposes.

With these and other objects in view, the invention consists of certain novel features of construction, combination and arrangement of parts, as will be more fully described and particularly pointed out in the appended claim.

In the accompanying drawings, Figure 1 is a side elevation of the knife, Fig. 2 is a similar view with the locking lever open, Fig. 3 is a side elevation showing the locking lever open and one side of the handle carried around in alinement with the blade, Fig. 4 is a similar view showing the blade open, Fig. 5 is a side elevation showing the blade locked in open position and the locking lever closed, with parts broken away to indicate the pivotal connections of the locking lever and the blade, Fig. 6 is a transverse section on the line 6—6 of Fig. 1 on an enlarged scale, Fig. 7 is a transverse section on the line 7—7 of Fig. 1, Fig. 8 is a detail longitudinal section on the line 8—8 of Fig. 1, and Fig. 9 is a detail perspective view of the parts arranged in separated position.

Referring more especially to the drawings, 1 and 2 represent the side pieces of the knife which are preferably lined with a sheet of brass, or other non-rusting material.

4 represents the blade, which is pivoted between the sides 1 and 2 upon the pivot bolt 5.

Formed in the brass plate 3 of the side 1 is an arc-shaped slot 6, having its ends on a line with a central line through the side and having its curved portion extending toward the back of the handle. In opposition to the slot 6 is a slot 7, of similar construction and having its curved portion extending forwardly from a central line drawn through the side 2. When the sides are clenched together in alinement the slots are arranged in position to each other on opposite sides of the knife so that they form a complete circle with their ends over-lapping each other so as to be engaged by an eccentrically arranged pivot pin 8, which extends through the blade 4 and has equal parts projecting on either side thereof. One portion of the pin extends into the slot 6 and the other portion of the pin extends into the slot 7.

In order to prevent the sides 1 and 2 from dividing upon the bolt 5 I provide a lock key 9, which is carried by the locking lever 10, pivoted at the lower end of the handle, and which is adapted to engage the keyhole slot 11, formed in the brass plate 3 of the handle 1.

In order to disengage the handle 1 from its connection with the locking key it is necessary to turn the locking lever 10 outwardly and then slightly lift the side 1 until it is free of the key 9. This frees the side 1 and allows it to turn upon the pivot bolt 5. The pin 8 travels in the slot 6 until it reaches its end when the knife blade 4 is carried around with the side 1 until the opposite side of the pin 8 catches the upper limiting end of the slot 7. At this time the pin will be located between the upper end of the slot 7 and the upper end of the slot 6 so that the blade is locked in distended position between the pivot bolt 5 and the pin 8. The lever 10 is then drawn into position with its upper end in engagement with the recessed portion 12 formed upon the rear end of the blade 4.

When it is desired to close the knife the lever 10 is moved so as to permit disengagement of the slot 11 from the key 9 of the side 1 turned in the reverse direction until it is parallel with the blade, thus bringing the pin in engagement with the lower end of the slot 6 so that the blade will move with the side 1 back to its normal position when it is locked be being engaged by the lower limiting end of the slot 6 and the lower limiting end of the slot 7. The locking lever is then thrown back in place and the knife has the appearance of an ordinary single-blade pocket-knife.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim and desire to secure by Letters Patent is:—

A knife comprising a pair of sides pivotally connected together and having oppositely disposed arcuate slots, a blade pivoted between the said sides, a pin carried by said blade adapted to work in said slots, a locking lever carried by said sides, and means controlled by said lever for locking the sides from pivotal movement.

In testimony whereof I have hereunto set my hand in presence of two subscribing witnesses.

GEORGE W. SODERSTRAND.

Witnesses:
  S. C. RISING,
  R. C. VAN GALDER.